(12) United States Patent
Eaton et al.

(10) Patent No.: US 7,259,481 B2
(45) Date of Patent: Aug. 21, 2007

(54) AUTOMATIC TRANSFER SWITCH CAPABLE OF RECEIVING INPUT POWER HAVING VOLTAGE WITHIN A WIDE RANGE

(75) Inventors: Zane C. Eaton, Plymouth, WI (US); John S. O'Grady, Martinez, CA (US)

(73) Assignee: Kohler Co., Kohler, WI (US)

( * ) Notice: Subject to any disclaimer, the term of this patent is extended or adjusted under 35 U.S.C. 154(b) by 427 days.

(21) Appl. No.: 10/789,691

(22) Filed: Feb. 27, 2004

(65) Prior Publication Data

US 2004/0233602 A1    Nov. 25, 2004

Related U.S. Application Data

(60) Provisional application No. 60/451,323, filed on Feb. 28, 2003.

(51) Int. Cl.
| | |
|---|---|
| H01H 47/00 | (2006.01) |
| H01H 83/00 | (2006.01) |
| H02B 1/24 | (2006.01) |
| H02J 7/00 | (2006.01) |

(52) U.S. Cl. .................................... 307/125
(58) Field of Classification Search ............... 307/125; 361/90; 363/34, 37
See application file for complete search history.

(56) References Cited

U.S. PATENT DOCUMENTS

| | | | |
|---|---|---|---|
| 3,636,368 A | 1/1972 | Sia | |
| 4,096,395 A | 6/1978 | Bogel et al. | |
| 4,218,625 A | 8/1980 | Beckwith et al. | |
| 4,384,213 A | 5/1983 | Bogel | |
| 4,538,231 A | 8/1985 | Abe et al. | |
| 4,747,061 A | 5/1988 | Lagree et al. | |
| 5,184,025 A | 2/1993 | McCurry et al. | |
| 5,475,296 A | 12/1995 | Vinsant et al. | |
| 5,594,631 A | 1/1997 | Katoozi et al. | |
| 6,172,432 B1 | 1/2001 | Schnackenberg et al. | |
| 7,061,139 B2* | 6/2006 | Young et al. | 307/45 |
| 2002/0079741 A1* | 6/2002 | Anderson | 307/64 |
| 2004/0189271 A1* | 9/2004 | Hansson et al. | 323/283 |

* cited by examiner

*Primary Examiner*—Michael Sherry
*Assistant Examiner*—Carlos Amaya
(74) *Attorney, Agent, or Firm*—Quarles & Brady; George E. Haas

(57) ABSTRACT

An automatic transfer switch (ATS) system and method of operating an ATS system are disclosed. The ATS system includes at least one input port capable of being coupled to at least one power source to receive an input power, a first internal component that requires internal power satisfying a first criterion in order to properly operate, and a power converter such as a switch mode power supply that is coupled to the first internal component and to the at least one input port. The power converter is capable of receiving the input power by way of the at least one input port and converting the input power into the internal power to be provided to the first internal component. The internal power provided by the power converter satisfies the first criterion, even though at least one characteristic of the input power varies within a range.

26 Claims, 2 Drawing Sheets

AUTOMATIC TRANSFER SWITCH CAPABLE OF RECEIVING INPUT POWER HAVING VOLTAGE WITHIN A WIDE RANGE

CROSS-REFERENCE TO RELATED APPLICATIONS

This application claims the benefit of U.S. provisional patent application No. 60/451,323, which was filed on Feb. 28, 2003.

FIELD OF THE INVENTION

The present invention relates to power control systems and, in particular, relates to automatic transfer switch (ATS) systems employed to control the coupling of one or more power sources to a load.

BACKGROUND OF THE INVENTION

Automatic transfer switch (ATS) systems are widely used to control the delivery of power from different power sources to a load and, in particular, used to control which one of a set of power sources provides power to the load at a given time.

ATS systems can be employed in a variety of situations, both commercial and residential. For example, a private residence normally receives its electrical power from a utility company. For various reasons, however (e.g., location in a region prone to severe weather), the homeowner can desire a back-up source of electrical power, so that comfort or at least habitability of the residence can be maintained, during periods in which utility power is unavailable.

Typically, a gasoline, diesel, propane or natural gas internal combustion engine-powered electrical generator, capable of generating three-phase power, is installed in or near the residence, and arranged (in a split-phase alternating voltage manner) to be connected to one or more of the electrical circuits in the residence in order to provide the desired back-up power. However, one cannot simply leave the back-up generator permanently connected, in parallel with the utility power, to the residential electrical circuits. Nor can one simply power up a back-up generator and connect it to the residential electrical circuits, without first disconnecting the residential circuits from the power lines coming in from the utility.

To effect the proper switching of the residential electrical circuits (or other load) from the utility to the back-up generator (and eventually back again to the utility), transfer switch systems can be employed. While manual transfer switch systems are available, ATS systems have become popular insofar as an ATS system is able to automatically switch from one power source (e.g., the utility) to another power source (e.g., the back-up generator) whenever the system detects that the one power source is not properly providing power, without the presence of a human operator.

ATS systems commonly employ relays, microprocessors and/or other internal components such as application-specific integrated circuits that make it possible for the ATS systems to provide their desired automatic functionality. To operate, these internal component(s) require power. Typically, this power must meet one or more criteria. For example, the internal component(s) may require power having a particular voltage level such as 12 Volt DC power or 5 Volt DC power.

The power for the internal components of an ATS system typically is provided from one of the power sources that are coupled to the ATS. The power sources that are coupled to a given ATS system can vary significantly in terms of the characteristics of the power that is output by the power sources to the ATS system. For example, the actual voltage levels of different power sources that can be coupled to an ATS system can vary significantly, e.g., from 0 Volts AC to near 600 Volts AC. Commonly, transformers or other power conversion devices are employed (typically, externally of the ATS system) to convert the voltage levels of the power sources to the levels required by the internal components of the ATS system.

Because different power sources can differ significantly from one another in terms of the characteristics of the power they provide, the external transformers or other conversion devices employed in conjunction with any given ATS system must be properly tailored for use with the specific power sources with which that ATS system is intended to be used. Consequently, once the ATS system is configured for operation, in conjunction with one or more of these external conversion devices, the ATS system can only operate in conjunction with the specific power sources that correspond to the selected external conversion devices. While the particular external conversion devices can be changed to allow the ATS system to operate in conjunction with other power sources, this typically requires the purchase of additional expensive components, or the expensive reconfiguration of the conversion devices.

Further, as discussed above, ATS systems are utilized because there are circumstances in which characteristics of the power delivered by any given power source will vary. To the extent that such variations occur, external transformers or other conversion devices that are designed to receive and process power meeting specific characteristics may no longer provide power satisfying the requirements of the ATS systems or otherwise not work properly. Again, to keep the ATS systems working properly, it may be necessary to obtain expensive additional components or perform expensive reconfigurations.

Additionally, if the power provided by a given power source varies to such an extent that proper power can no longer be provided to the internal components of the ATS system, it will be necessary for the ATS system to switch in its operation so that power from an alternate power source can be provided to the internal components. Thus, special switching components are needed within the ATS system to guarantee that an appropriate one of the power sources is providing power to the internal components of the ATS system at any given time.

It would therefore be advantageous if a new ATS system could be designed that was capable of receiving, from a variety of different types of power sources, power having a variety of different characteristics and, in response, capable of supplying power to the internal component(s) of the ATS systems, where the characteristics of the supplied power met the power requirements of the internal components. Additionally, it would be advantageous if such an ATS system did not require the use of external transformers or other conversion devices, particularly the use of such devices that were especially configured for operation in conjunction with certain power sources.

Further, it would be advantageous if such an ATS system could continue to provide power to its internal components that met the power requirements of those components, even when characteristics of the power being provided to the ATS system by the power sources varied over time. Additionally, it would be advantageous if such an ATS system was not significantly more complicated or expensive to implement than conventional ATS systems.

SUMMARY OF THE INVENTION

The present inventors have discovered that it is possible to design an automatic transfer switch (ATS) system that is able to supply power with characteristics required by the internal component(s) of the ATS system, despite variation in the characteristics of power provided by power sources to the ATS system, by including a switch mode power supply within the ATS system.

In contrast to some conventional power supplies, the switch mode power supply is capable of receiving and utilizing power from two power sources simultaneously, regardless of whether one or both of the power sources is actually providing power at any given time. In at least some embodiments, the switch mode power supply is capable of receiving and utilizing power provided from two phases of each of two three-phase source configurations, where the three-phase source configurations can be any industry standard three-phase source configuration including, but not limited to, delta configurations, wye configurations, and corner grounded delta configurations (and the two three-phase source configurations need not be the same).

In at least some embodiments, the switch mode power supply includes a rectifier section that allows two or more power sources to supply power simultaneously to the switch mode power supply, without the need for any switching mechanism to switch between those multiple power sources. The power from the rectifier section is filtered to provide high-voltage DC power, which in turn is provided to a switch mode regulator. The switch mode regulator converts the DC power to a desired low-voltage level (e.g., 12V DC power), which after being filtered is suitable for use by one or more of the internal components of the ATS system.

In particular, the present invention relates to an automatic transfer switch (ATS) system that includes at least one input port capable of being coupled to at least one power source to receive an input power, a first internal component that requires internal power satisfying a first criterion in order to properly operate, and a power converter coupled to the first internal component and to the at least one input port. The power converter is capable of receiving the input power by way of the at least one input port and converting the input power into the internal power to be provided to the first internal component. The internal power provided by the power converter satisfies the first criterion, even though at least one characteristic of the input power varies within a range.

The present invention further relates to an automatic transfer switch (ATS) system that includes an internal component within the ATS system that requires, for its operation, internal power satisfying a criterion. The ATS system further includes means for receiving an input power provided from at least one outside power source, and means for converting the input power into the internal power satisfying the criterion even though at least one characteristic of the input power varies within a range. The means for converting is coupled to the means for receiving and to the internal component.

The present invention additionally relates to a method of providing internal power to an internal component within an ATS system based upon input power received from first and second external power sources, where the internal power provided to the internal component satisfies a criterion despite variation of at least one characteristic of the input power. The method includes rectifying the input power at a rectifier to produce rectified power, and converting the rectified power into a modified rectified power by way of the switching mechanism, where the internal power is based upon the modified rectified power. The converting includes developing a feedback signal indicative of an aspect of the modified rectified power that can vary as a result of the variation of the at least one characteristic of the input power, and adjusting the converting in response to the feedback signal so that the internal power based upon the modified rectified power satisfies the criterion.

The present invention further relates to a power conversion device capable of being coupled to at least first and second power sources and providing a low-voltage output power based upon a combination of first and second powers provided by the first and second power sources, respectively. The power conversion device includes a rectifier section, a switch mode regulator section coupled to the rectifier section, and at least one filter section coupled to at least one of the switch mode regulator section and the rectifier section. The rectifier section includes a first diode array capable of receiving and rectifying the first power and a second diode array capable of receiving and rectifying the second power, where output ports of the first and second diode arrays are coupled to one another so that the rectified first and second powers are combined to form a first modified power. The switch mode regulator provides a second modified power based upon the first modified power. The low voltage output power is one of the second modified power and a filtered power provided as a result of operation of the filter section upon the second modified power.

DETAILED DESCRIPTION OF THE PREFERRED EMBODIMENT

Figure 1:
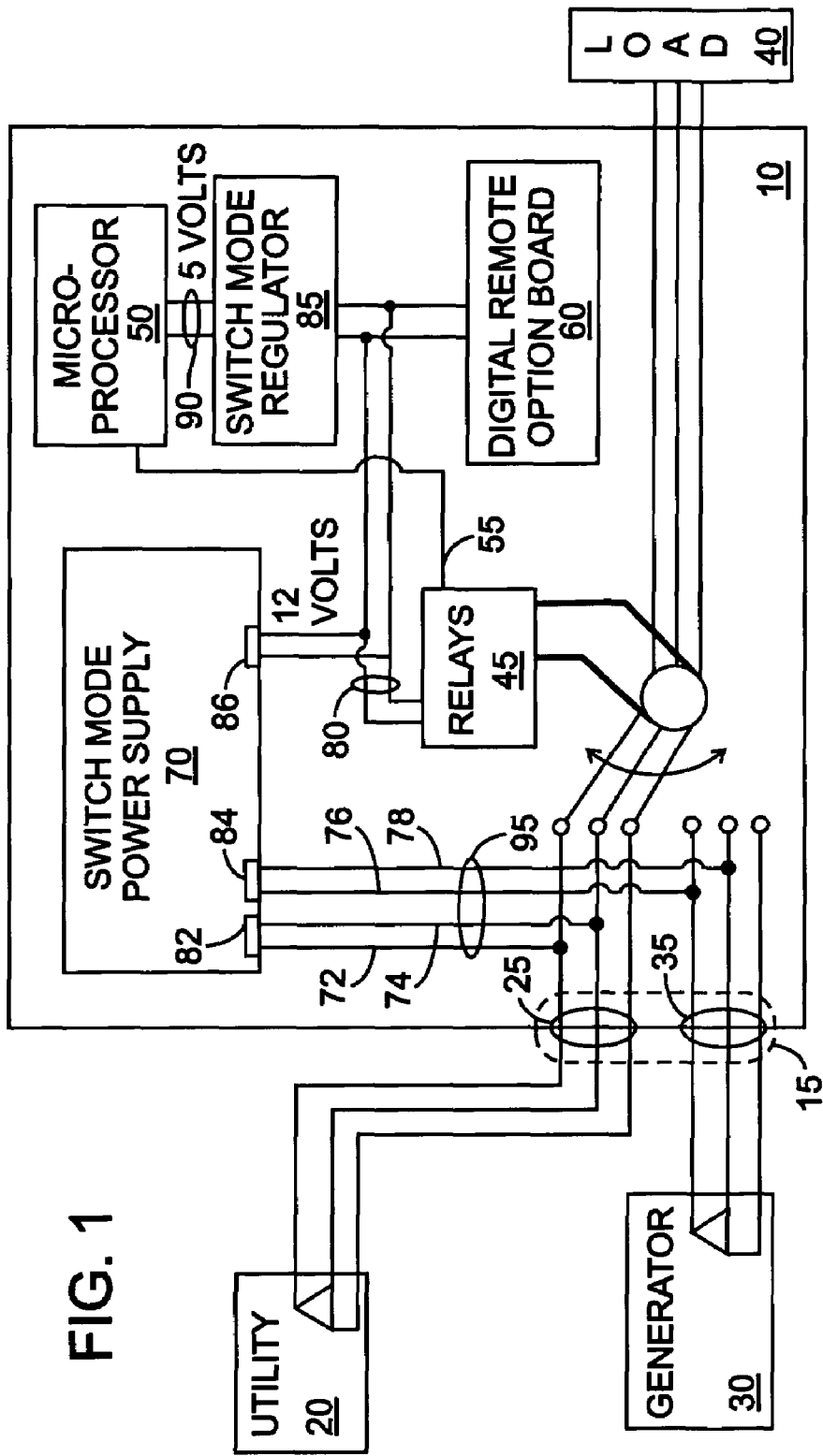
FIG. 1 is a block diagram showing an exemplary automatic transfer switch (ATS) system in accordance with one embodiment of the present invention, which is coupled to a first power source (a utility), a second power source (a generator), and a load.

Referring to FIG. 1, a new automatic transfer switch (ATS) system 10 is shown coupled to a utility 20 (e.g., power lines), a generator set or "genset" 30, and a load 40. The ATS system 10 receives three-phase power from the utility 20 and genset 30 at first and second input ports 25 and 35, respectively, which together can be considered as forming an overall input port 15. Internal to the ATS system 10 are one or more switching devices such as relays 45, which govern whether power from the utility 20 or from the genset 30 is provided at any given time to the load 40. For example, in many circumstances, the relays 45 will normally be positioned to allow power to be provided to the load 40 from the utility 20 (as shown) and only switch to allow power to be provided to the load from the generator 30 when for some reason a failure has occurred with the utility.

In addition to the relays 45, the ATS system 10 also includes other internal components, some of which are typically control components. In the embodiment shown, these components include in particular a microprocessor 50 and a digital remote option board 60. In the embodiment shown, the relays 45 are controlled by the microprocessor 50 by way of one or more communication links 55. The microprocessor 50, digital remote option board 60 and relays 45 are intended to be exemplary of a variety of different types of internal components or circuitry that can be employed in the ATS system 10. For example, in alternate embodiments, the microprocessor 50 could be replaced with, or be supplemented by, other devices such as application specific integrated circuits (ASICs), programmable logic devices (PLDs), discrete circuit components and other components.

In accordance with an embodiment of the present invention, power is provided to the internal components 45, 50 and 60 by way of a switch mode power supply (SMPS) 70 of the ATS system 10. In the present embodiment, first and second phases 72, 74, 76 and 78 of the 3-phase power received at the first and second input ports 25 and 35, respectively, are coupled to the SMPS 70. The SMPS 70 in turn converts the power of the phases 72, 74, 76 and 78 into power having characteristics that satisfy the power needs of some or all of the internal components 45, 50 and 60. In the embodiment shown, for example, the relays 45 and the digital remote option board 60 require power having a constant voltage of 12 volts DC. In contrast, the microprocessor 50 requires power having a constant voltage of 5 volts DC. Thus, in the embodiment shown, the SMPS 70 provides 12 volt DC power via connections 80 to the relays 45 and 60. The connections 80 further provide 12 volt DC power to a conventional switch mode regulator 85, which converts the 12 volt DC power into 5 volt DC power. This 5 volt DC power is in turn provided to the microprocessor 50 by additional connections 90.

In the embodiment shown, each of the utility 20 and the generator 30 provide 3-phase power in a delta format to the respective first and second input ports 25 and 35. The SMPS 70 is connected internally, within the ATS 10, by way of internal connections 95 to receive the first and second phases 72, 74, 76 and 78 of power after it has already been provided to the first and second input ports 25 and 35. However, in alternate embodiments, the first and second phases of power 72, 74, 76 and 78 can be provided to the SMPS 70 from the utility 20 and generator 30 by way of additional input ports (not shown), and the power can be in a different format (e.g., a wye format). That is, in certain embodiments, the ATS 10 has separate input ports for coupling the power of the power sources 20, 30 (or other power sources) to the SMPS 70 and coupling the power sources to the load 40 as determined by the relays 45. The SMPS 70 receives the power provided by the first and second phases 72, 74 from the first input port 25 at a first input port 82, and receives the power from the first and second phases 76, 78 provided via the second input port 35 at a second input port 84. The SMPS 70 outputs the 12 volt DC power at its output port 86.

Figure 2:
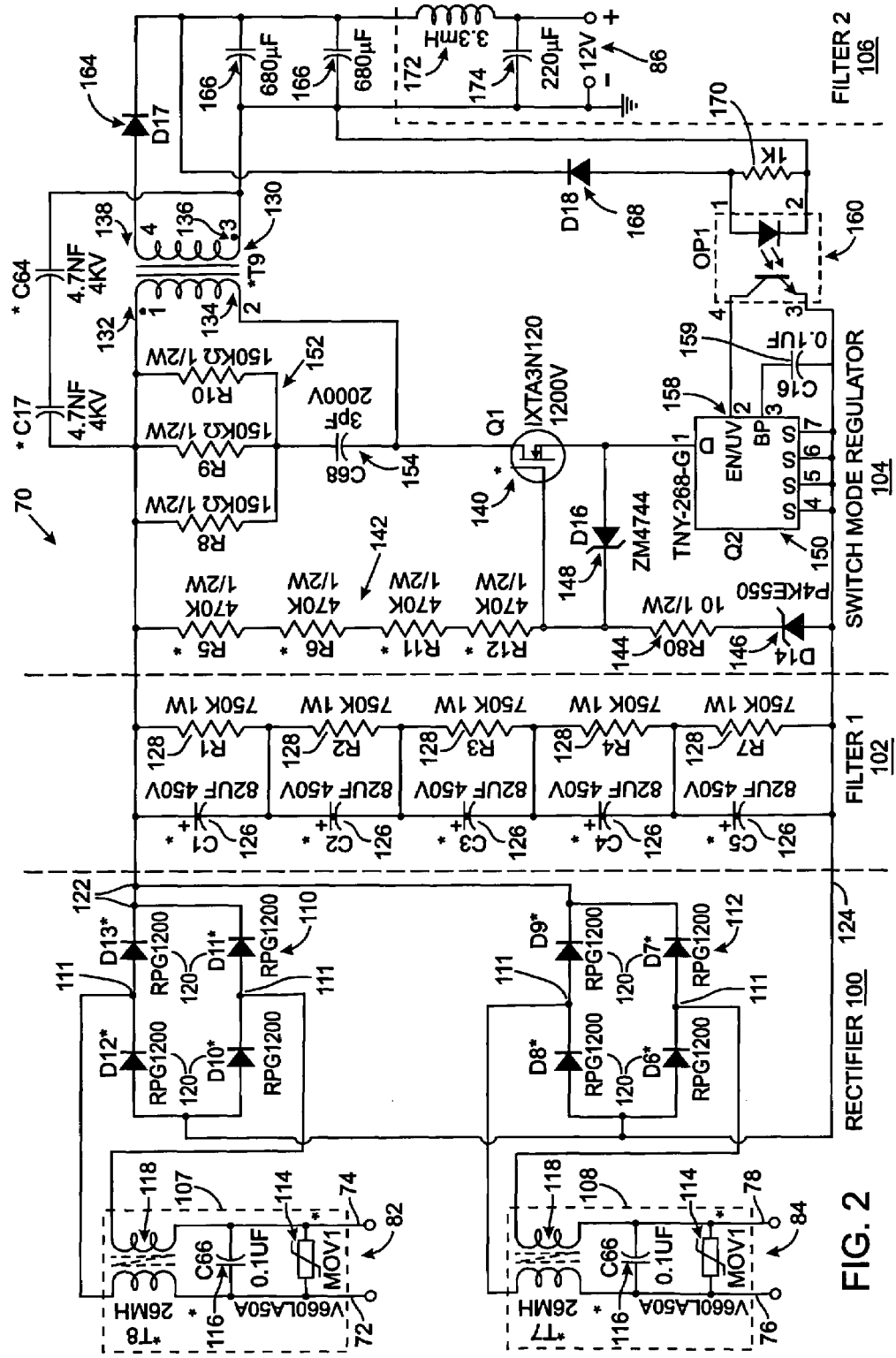
FIG. 2 is a schematic diagram showing exemplary components of a switch mode power supply employed within the ATS system of FIG. 1 to provide suitable power to internal components of the ATS system.

Turning to FIG. 2, the SMPS 70 is shown in greater detail. As shown, the SMPS 70 includes a rectifier section 100, a first filter section 102, a switch mode regulator section 104, and a second filter section 106. As shown, power is input to the SMPS 70 at the first and second input ports 82 and 84. The first input port 82 is coupled to the first and second phases 72, 74 of the power received at the first input port 25, while the second input port 84 is coupled to the first and second phases 76, 78 of the power received from the second input port 35.

The rectifier section 100 includes first and second preprocessing circuits 107 and 108, respectively, and first and second diode arrays 110 and 112, respectively. Each of the preprocessing circuits 107 and 108 includes a respective varistor 114 that is shunted between the two phases input to the respective preprocessing circuit, a respective capacitor 116 that also is shunted between the two phases, and additionally a respective pair of inductors 118 coupling the respective phases with respective input terminals 111 of the respective diode arrays 110 and 112. The varistors operate as transient voltage surge suppressors.

Each of the respective diode arrays 110, 112 has four diodes 120 connected in a conventional manner to provide full-wave rectification. Respective first output terminals 122 of each of the diode arrays 110 and 112 are coupled together, as are respective second output terminals 124 of each of the diode arrays. Consequently, the first and second input powers provided at the first and second input ports 82 and 84 are effectively combined to form a single high-voltage power provided at the output terminals 122, 124. In preferred embodiments, the diodes 120 of the diode arrays 110, 112 are high voltage tolerant diodes that are capable of receiving and handling high voltages (and power) supplied from a variety of industry standard three-phase source configurations including, but not limited to, wye, delta and corner grounded delta configurations, and also including circumstances where the source configurations of the power sources 20, 30 are not the same. In particular, the high voltage tolerant diodes are capable of handling large voltage differentials that can occur between the two power sources 20, 30 (e.g., if the sources are 180 degrees out of phase with respect to one another).

The first filter section 102 can be a low-pass filter having any of a variety of conventional designs. In the embodiment shown, five capacitors 126 (in this case, each of which has a capacitance of 82 microfarads and is rated at 450 volts) are coupled in series between the first and second output terminals 122 and 124. Additionally, five biasing resistors (in this case, each having a resistance of 750 kiloohms and rated at 1 watt) also are coupled in series with one another between the first and second output terminals 122 and 124. Additionally, the junction between each adjoining pair of the capacitors 126 is coupled to the corresponding junction between each adjoining pair of the resistors 128, such that the voltages that appear at the junctions between the resistors also exist between the corresponding pairs of capacitors, thus biasing the capacitors 126.

The rectified power at the output terminals 122, 124, as filtered by the first filter section 102, is then provided to the switch mode regulator section 104. As shown, the switch mode regulator section 104 includes a transformer 130 that has first, second, third and fourth ports 132, 134, 136 and 138 respectively. The first terminal 132 is coupled to the first output terminal 122, while the second port 134 is coupled to the drain of a high voltage power metal oxide semiconductor field effect transistor (MOSFET) 140. In the present embodiment, the MOSFET 140 is the IXTA3N120 high voltage power MOSFET manufactured by IXYS Corporation of Santa Clara, Calif., although other switching devices can be employed in alternate embodiments.

A gate of the MOSFET 140 is biased by way of a set of four series-coupled 470 kiloohm (½ watt) resistors 142, which couple the gate with the first output terminal 122, and additionally by a 470 kiloohm (½ watt) resistor 144 and a zener diode 146 connected in series between the gate and the second output terminal 124 (with the anode of the zener diode coupled directly to the second output terminal). The zener diode 146 operates to maintain the junction between the additional resistor 144 and the cathode of the zener diode at approximately 550 volts. An additional zener diode 148 is coupled in between the source of the MOSFET 140 and the gate of the MOSFET 140 (with the anode of that zener diode being coupled to the source). A second set of 150 kiloohm (½ watt) resistors 152 are coupled in parallel with one another between the first output terminal 122 and an additional 3 picofarad (2000 volt) capacitor 154, which in turn is coupled also to the second terminal 134 of the transformer 130.

The source of the MOSFET 140 is further coupled to an output port 156 of a low power offline switching circuit 150 having an input terminal 158 that is coupled to a collector of an optoisolator 160, the emitter of which is coupled to the second output terminal 124. In one embodiment, the switching circuit 150 is a TNY268G microcircuit manufactured by Power Integrations Inc. of San Jose, Calif. As shown, in the present embodiment, an additional port of the switching circuit 150 is coupled to the second output terminal 124 by a 0.1 microfarad biasing capacitor 159, and certain other ports of the switching circuit are coupled directly to the second output terminal 124. In alternate embodiments, other switching circuits and isolating circuitry can be employed in place of the particular switching circuit 150 and optoisolator 160.

The third port 136 of the transformer 130 is both coupled to ground and to the first port 132 by way of a pair of series-connected 4.7 nanofarad (4 kilovolt) capacitors 162. Further, the fourth port 138 of the transformer 130 is coupled to the anode of a first diode 164, the cathode of which is coupled to two 680 microfarad capacitors 166 and the cathode of a second diode 168. Each of the capacitors 166 is coupled between the cathode of the first diode 164 and the third terminal 136 of the transformer 130 (and to ground). A 1 kiloohm resistor 170 is coupled between the anode of the second diode 168 and the third terminal 136 (which is grounded). The opposite nodes of the resistor 170 additionally are coupled respectively to first and second input terminals of the optoisolator 160 (such that the second input terminal of the optoisolator also is grounded).

The operation of the switch mode regulator section 104 overall is to provide a low voltage DC power output across the capacitors 166. The switch mode regulator section 104 accomplishes this due to the operation of the switching circuit 150, which generates a pulse width modulated (PWM) output signal at the output port 156 in response to feedback received at the input terminal 158 by way of the optoisolator 160. The PWM output signal in turn causes the MOSFET 140 to turn on and off. A voltage of lesser magnitude than that existing between first and second output terminals 122, 124 is consequently produced across the capacitors 166, where the magnitude of the voltage depends upon the duty cycle of the PWM output signal. The low voltage produced across the capacitors 166 is largely DC due to the operation of the transformer 160, and also due to the rectification provided by the first diode 164 and the capacitors 166 themselves.

This low voltage power output in turn is provided to the second filter section 106, which includes a 3.3 millihenry inductor 172 and a 220 microfarad capacitor. As shown, the inductor 172 is coupled between the cathode of the first diode 164 and the capacitor 174, which in turn is coupled between the inductor 172 and ground (the third terminal 136 of the transformer 130), and the second filter section operates as a low-pass filter. The junction between the inductor 172 and the capacitor 174, and the ground junction (the third terminal 136) form the output port 86 of the SMPS 70.

In the embodiment shown, with the particular choices and configuration of circuit components including the values of the resistors, capacitors, inductors, and the programming of the switching circuit 150, the SMPS 70 is designed to provide a 12 volt DC power output at the output port 86. However, in alternate embodiments in which other design choices are made, output power having other desired characteristics can be provided. In certain embodiments, one of both of the first and second filter sections 102, 106 can be eliminated or replaced with other filtering mechanism(s).

With this design, the SMPS 70 is capable of delivering power having a desired voltage level to internal components of the ATS system 10 regardless of which of the power sources 20, 30 is/are delivering power at any given time. Additionally, the SMPS 70 continues to be capable of delivering power having a desired voltage level even if the characteristics of the power (e.g., voltage levels) provided by the power sources varies significantly. In particular, the switching circuit 150 varies the PWM output signal based upon the feedback from the optoisolator 160 to maintain the output voltage from the SMPS 70 at desired levels. The particular embodiment of the SMPS 70 shown in FIG. 2 is capable of providing a 12 Volt DC output for a wide range of input voltages form the power sources 20, 30 (for example, input voltages that vary within one of a first range of 0 to 300 Volts AC and a second range of 300 to 600 Volts AC).

Additionally, the SMPS 70 makes it possible to deliver desired power to internal components of the ATS system 10 from a wide variety of different power sources (such as power sources 20, 30 or other power sources) that may provide power with a variety of characteristics, without any particularly-complicated circuit components or devices external to the ATS system 10, or any components/devices that are tailored for use in conjunction with specific power sources.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. An automatic transfer switch (ATS) system comprising:
    a first input port for receiving alternating current from a first power source;
    a second input port for receiving alternating current from a second power source;
    a first internal component that requires internal power satisfying a first criterion with respect to at least one characteristic in order to properly operate; and
    a power converter coupled to the first internal component and coupled simultaneously to the first input port and the second input port, wherein the power converter receives alternating current input power by way of the first and second inputs ports and converting the input power into the internal power to be provided to the first internal component, and
    wherein the internal power provided by the power converter satisfies the first criterion, even though the at least one characteristic of the input power varies within a range.

2. The ATS system of claim 1, the at least one input port is capable of receiving first and second input powers from first and second external power sources, and wherein the power converter is capable of combining the first and second input powers to provide the internal power.

3. The ATS system of claim 1, wherein the power converter includes a rectifier section and a switch mode regulator section coupled to one another.

4. The ATS system of claim 3, wherein the power converter further includes a first filter section that couples the rectifier section and the switch mode regulator section.

5. The ATS system of claim 4, wherein the power converter further includes a second filter section that is coupled to the switch mode regulator section.

6. The ATS system of claim 5, wherein the input power is provided to the rectifier section, the internal power is provided from the second filter section, and each of the first and second filter sections operates as a low-pass filter.

7. The ATS system of claim 4, wherein the switch mode regulator section includes a transistor, a switching control device, and a transformer having first, second, third and fourth transformer terminals, wherein the first transformer terminal is coupled to a first output terminal of the rectifier section, wherein the second transformer terminal is coupled to a transistor, which in turn is coupled to the switching control device, wherein the fourth transformer terminal is coupled to a first diode that in turn is coupled to a second diode by which a feedback signal is provided to the switching control device, wherein a junction between the first and second diodes is coupled to the third transformer terminal by at least one capacitor, and wherein the internal power is based upon an intermediate power provided by way of the junction and the third transformer terminal.

8. The ATS system of claim 7, wherein the switch is a transistor is a MOSFET and the switching control device is a microcircuit that outputs a pulse width modulated signal to the MOSFET based upon the feedback signal.

9. The ATS system of claim 3, wherein the at least one input port includes a first input port that is capable of receiving a first input power from a first power source and a second input port that is capable of receiving a second input power from a second power source.

10. The ATS system of claim 9, wherein each of the first and second input powers has three phases in an arrangement that is one of a delta arrangement, a wye arrangement and a corner-grounded delta arrangement, and wherein two of the three phases of each of the first and second input powers are coupled to the rectifier as the input power.

11. The ATS system of claim 9, wherein the rectifier section includes a first diode array that receives the first input power and a second diode array that receives the second input power, wherein the first and second diode arrays respectively rectify the first and second input powers, wherein respective first output terminals of each of the first and second diode arrays are coupled to one another and respective second output terminals of each of the first and second diode arrays are coupled to one another so that an overall rectified power based upon either or both of the first and second input powers is developed.

12. The ATS system of claim 1, wherein the criterion is that a voltage of the internal power remains at one of substantially 12 Volts DC and substantially 5 Volts DC.

13. The ATS system of claim 1, wherein the power converter includes a switch mode power supply (SMPS) and a switch mode regulator coupled to an output terminal of the SMPS.

14. The ATS system of claim 13, further comprising a second internal component that requires secondary internal power satisfying a second criterion in order to properly operate, wherein internal power satisfying the first criterion is provided at the output terminal of the SMPS and the secondary internal power satisfying the second criterion is provided by the switch mode regulator.

15. The ATS system of claim 14, wherein the first internal component includes at least one of a relay and a digital remote option board, and the second internal component includes a microprocessor.

16. The ATS system of claim 1, wherein the at least one characteristic of the input power that varies is a voltage of the input power, which varies within one of a first range of 0 to 300 Volts AC and a second range of 300 to 600 Volts AC.

17. The ATS system of claim 1 wherein the power converter comprises a switch mode power supply (SMPS) from which the internal power is provided.

18. The ATS system of claim 1 wherein the internal power provided by the power converter is a direct current.

19. In an automatic transfer switch (ATS) system, a method of providing internal power to an internal component within the ATS system based upon input power received from first and second external power sources, wherein the internal power provided to the internal component satisfies a criterion despite variation of at least one characteristic of the input power, the method comprising:

rectifying the input power at a rectifier to produce rectified power; and converting the rectified power into a modified rectified power by way of a switching mechanism, wherein the internal power is based upon the modified rectified power, and wherein the converting includes developing a feedback signal indicative of an aspect of the modified rectified power that can vary as a result of the variation of the at least one characteristic of the input power; and adjusting the converting in response to the feedback signal so that the internal power based upon the modified rectified power satisfies the criterion.

20. The method of claim 19, further comprising filtering the rectified power by way of a first low-pass filter before converting the rectified power; and filtering the modified rectified power to develop the internal power.

21. The method of claim 19, wherein the input power includes a first input power from a first of the external power sources and a second input power from a second of the external power sources, and wherein the rectifier simultaneously rectifies each of the first and second input powers and combines the first and second input powers to generate the rectified power.

22. A power conversion device capable of being coupled to at least first and second power sources and providing a low-voltage output power based upon a combination of first and second powers provided by the first and second power sources, respectively, the power conversion device comprising:

a rectifier section including a first diode array capable of receiving and rectifying the first power and a second diode array capable of receiving and rectifying the second power, wherein output ports of the first and second diode arrays are coupled to one another so that the rectified first and second powers are combined to form a first modified power;

a switch mode regulator section coupled to the rectifier section, wherein the switch mode regulator provides a second modified power based upon the first modified power; and at least one filter section coupled to at least one of the switch mode regulator section and the rectifier section, wherein the low-voltage output power is one of the second modified power and a filtered power provided as a result of operation of the filter section upon the second modified power.

23. An automatic transfer switch (ATS) system for selectively connecting a load to a first input power and a second input power each having three phases of alternating current, the ATS system comprising:

an internal component within the ATS system that requires, for its operation, internal power satisfying a first criterion;

a first input port for receiving the three phases of the first input power;

a second input port for receiving the three phases of the second input power; and a switch mode power supply that is connected to only two phases of the first input power and to only two phases of the second input power and converting the first and second input powers into the internal power satisfying the first criterion even though at least one characteristic of the input power varies within a range, the switch mode power supply operatively coupled to supply the internal power to the internal component.

24. The ATS system of claim 23 further comprising a switch mode regulator coupled to an output terminal of the switch mode power supply and producing secondary internal power satisfying a second criterion.

25. The ATS system of claim 23 wherein the switch mode power supply comprises a rectifier section that converts the input power into direct current, a first filter section coupled to the rectifier section and receiving the direct current, a switch mode regulator section connected to the first filter section and having an output connection, and a second filter section that is coupled to the output connection.

26. The ATS system of claim 23 wherein the switch mode power supply is simultaneously connected to the first input power and to the second input power.

* * * * *